United States Patent
Sheerin et al.

(10) Patent No.: US 9,269,185 B2
(45) Date of Patent: Feb. 23, 2016

(54) SYSTEM AND METHOD FOR PROCEDURAL CG EYE MENISCUS

(71) Applicants: Daniel Paul Sheerin, Westchester, CA (US); John T. Monos, Venice, CA (US)

(72) Inventors: Daniel Paul Sheerin, Westchester, CA (US); John T. Monos, Venice, CA (US)

(73) Assignees: SONY CORPORATION, Tokyo (JP); SONY PICTURES TECHNOLOGIES INC., Culver City, CA (US)

(*) Notice: Subject to any disclaimer, the term of this patent is extended or adjusted under 35 U.S.C. 154(b) by 205 days.

(21) Appl. No.: 13/756,020

(22) Filed: Jan. 31, 2013

(65) Prior Publication Data
US 2014/0210815 A1    Jul. 31, 2014

(51) Int. Cl.
  *G06T 15/00* (2011.01)
  *G06T 17/00* (2006.01)
  *G06T 13/40* (2011.01)

(52) U.S. Cl.
  CPC ............... *G06T 17/00* (2013.01); *G06T 13/40* (2013.01)

(58) Field of Classification Search
  CPC .......... G06T 17/00; G06T 15/00; G06T 19/20
  USPC .................................................. 345/419, 420
  See application file for complete search history.

(56) References Cited

U.S. PATENT DOCUMENTS 7,388,580 B2    6/2008   Birdwell
8,830,226 B2 *  9/2014   Goossens ...................... 345/419

OTHER PUBLICATIONS

Kerwin et al, Enhancing Realism of Wet Surfaces in Tenporal Bone Surgical Simulation, IEEE Trans Vis Comput Graph, Sep. 2009, 15(5): 747-758.*
Banf et al., Example-Based Rendering of Eye Movements, Eurographics 2009, vol. 28, No. 2, 2009, 8 pages. http://mi.informatik.uni-siegen.de/publications/banf_eg09.pdf.

* cited by examiner

*Primary Examiner* — Phu K Nguyen
(74) *Attorney, Agent, or Firm* — Mark D. Wieczorek; Mayer & Williams PC (57) ABSTRACT

Systems and methods are disclosed to provide a highly convenient and practically automated system for creation of highly-realistic menisci for CG characters. Creating the meniscus in the correct place and maintaining its correlation with moving eyes and eyelids was in the past difficult. The systems and methods disclosed provide a highly-realistic way to create and control such features. The systems and methods may create the meniscus in a procedural fashion, allowing the meniscus to properly track movements of character eyes and eyelids and to be animated in a highly-realistic fashion.

20 Claims, 7 Drawing Sheets

SYSTEM AND METHOD FOR PROCEDURAL CG EYE MENISCUS

BACKGROUND

The meniscus around the eye is an important element in making realistic eyes for computer-generated (CG) characters. The meniscus is essentially a watery layer that forms where the eyelid contacts the eyeball. Creating a meniscus in the correct place and making its appearance realistic is a highly challenging problem in CG modeling.

Prior attempts at modeling menisci involve creating a number of modeled spans around an eye to achieve, e.g., a highlight between the eyeball and tear duct. But such custom modeling is highly time- and effort-consuming.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

The systems and methods according to principles disclosed here provide a highly convenient and practically automated system for creation of highly-realistic menisci for CG characters. Creating the meniscus in the correct place and maintaining its correlation with moving eyes and eyelids was in the past difficult. The systems and methods according to principles disclosed here provide a highly-realistic way to create and control such features.

In an implementation, the systems and methods create the meniscus in a procedural fashion, allowing the same to properly track movements of character eyes and eyelids and to be animated in a highly-realistic fashion.

In one aspect, the invention is directed towards a method of creating a meniscus for a computer-generated object, including: in a computer-generated object, for a liquid component surrounded by a surface mesh, identifying a loop of the surface mesh surrounding the liquid component as a locus of points for a meniscus to potentially bind to; dividing the loop into a number of radial edges, and assigning at least one point per radial edge to create a plurality of points, the points for the meniscus to bind to, at least one point of the plurality not in contact with the liquid component; drawing a curve, the curve joining the plurality of points together to form an outer boundary of the meniscus; and lofting the points by a desired distance to create an inner boundary of the meniscus, the inner and outer boundary forming a ribbon around a portion of the liquid component, the ribbon defining the meniscus.

Implementations of the invention may include one or more of the following. Where the object is a character, the liquid component may be a tear film layer, and the surface may be an eye socket. The method may further include analyzing a surface of a character to identify a candidate eye socket by searching for one or more recesses or discontinuous mesh areas. The method may further include identifying a correct eye socket using at least in part proximity of a recess or discontinuous mesh area to an eyeball, the eyeball having the tear film layer defined thereon. A position of the at least one point of the plurality not in contact with the liquid component may be defined by finding an intersection of the radial edge with the eyeball having the tear film layer defined thereon, and offsetting the point a desired distance along the radial edge away from the intersection. The desired distance may be at least in part dependent on the size of the eye socket, or may be a default value or is a parameter entered by a user. The method may further include coupling the inner boundary of the meniscus to a set of points on the eye on the tear film layer on the eyeball. The meniscus may be configured such that a lower section is thicker than an upper section. A shape or thickness of the meniscus may be configured by a shader, and the shape may be concave or convex. The shader may configure the shape such that a lower portion of the meniscus is thicker than an upper portion of the meniscus. At least the assigning, drawing, and lofting steps may be performed procedurally.

In another aspect, the invention is directed towards a non-transitory computer-readable medium, including instructions for causing a computing environment to perform the above method.

In a further aspect, the invention is directed towards a meniscus plug-in for a computer-generated modeling application, the plug-in including: an input module to receive a computer-generated model; an analysis module to determine at least one feature of the module in which a liquid component may exhibit a meniscus; and a meniscus module to procedurally modify the model or procedurally add to the model to cause a meniscus to appear.

Implementations of the invention may include one or more of the following. The plug-in may further include a shader module to modify the shape or thickness of the meniscus. The meniscus module may further include: for the feature, an identification module to identify a loop of surface around the feature as a locus of points for the meniscus to potentially bind to and to divide the loop into a number of radial edges; a point-assigning module to assign at least one point per radial edge, the point in contact with or intersecting with the liquid layer; an offset module to define at least one offset point per radial edge, the offset point not in contact with the liquid layer, a set of offset points for the meniscus to bind to; a boundary-defining module to define a boundary, the boundary joining the points together to form an outer boundary of the meniscus around the feature; and a lofting module to loft the offset points by a desired distance to create an inner boundary of the meniscus, the inner and outer boundary forming a ribbon around a portion of the feature, the ribbon defining the meniscus. The plug-in may further include a binding module to bind the inner boundary to the feature. The meniscus module may be configured such that at least the assigning, drawing, and lofting steps are performed procedurally.

Advantages of certain implementations of the invention may include one or more of the following. Systems and methods according to certain implementations allow creation, generation, and control of a CG meniscus in a procedural fashion, allowing the same to track and recalculate movements of eyelids and eyes in a natural way, i.e., "on the fly", without the need to adapt custom geometry in a cumbersome fashion. Such is particularly advantageous as highly-realistic models of the eye take account of the varying radius of the eye, e.g., at the corneal bulge, and certain implementations allow a CG meniscus to track even as an eye with a varying radius moves in an eye socket. Systems and methods according to certain implementations may provide a convenient way to create a meniscus for a CG character. Default settings may be employed to allow particularly convenient creation, which is practically automatic, though the user may enter parameters to allow greater control of the appearance of a meniscus.

This Summary is provided to introduce a selection of concepts in a simplified form that are further described below in the Detailed Description. This Summary is not intended to identify key features or essential features of the claimed sub-

BRIEF DESCRIPTION OF THE DRAWINGS

Like reference numerals refer to like elements throughout. Figures are not to scale unless otherwise noted.

DETAILED DESCRIPTION

Figure 1:
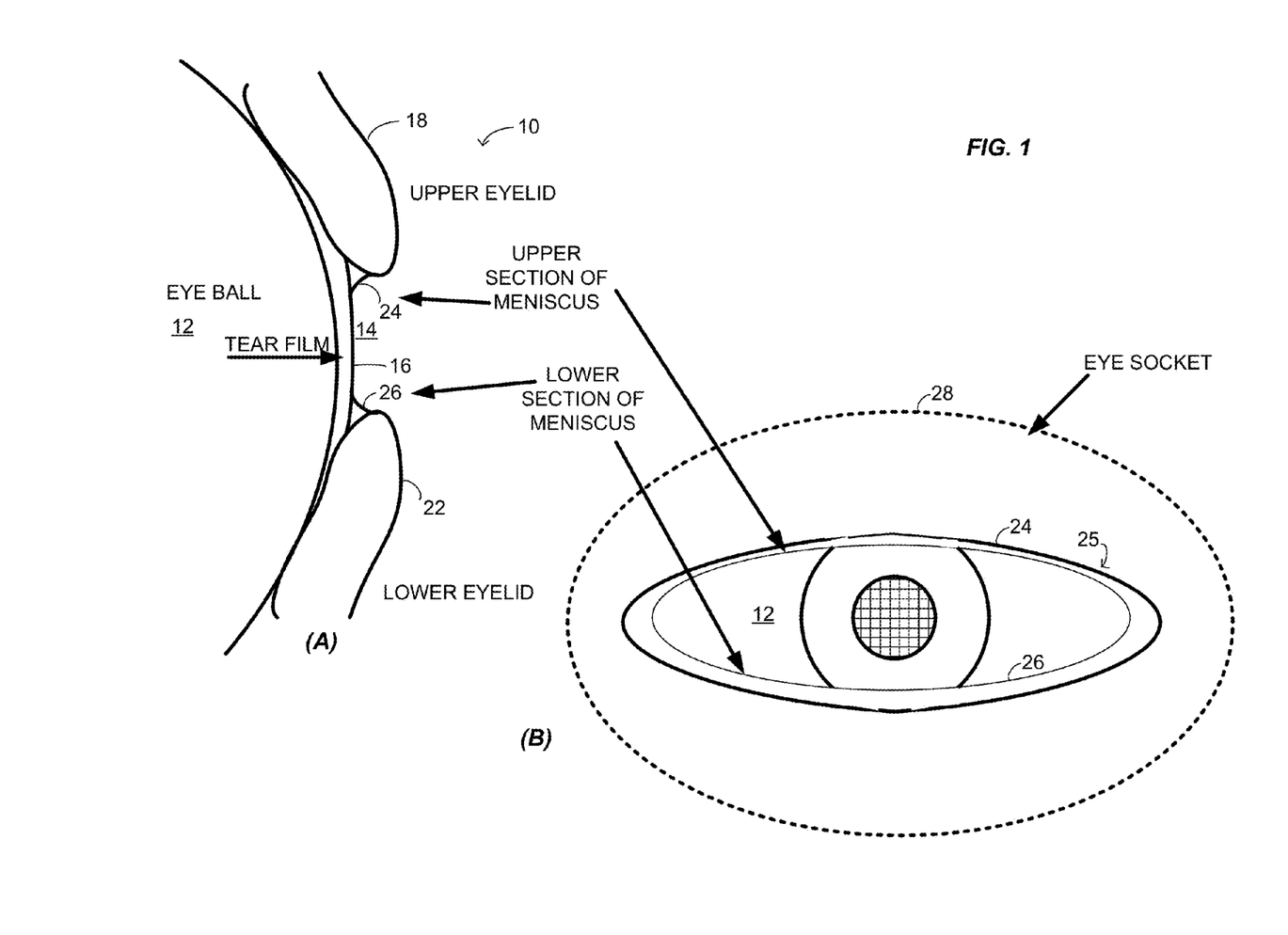
FIGS. 1(A) and 1(B) illustrate side and front views, respectively, of components of a CG eye, eye socket, and eyelid.

Referring to FIGS. 1(A) and 1(B), a simplified schematic diagram of an eye system 10 is illustrated. The eye system 10 depicts an eyeball 12 with a fluid layer 14 atop the same. The fluid layer 14 is "termed a tear film layer", and the same coats the surface of the eye. In advanced CG modeling, lighting steps may take account of reflection and refraction from and through the tear film layer 14. In systems and methods according to principles disclosed here, most of the tear film layer 14 is parallel to the eyeball surface to which it is adjacent, and thus does not contribute specifically to meniscus effects. This noncontributing portion is indicated by reference numeral 16. At the location of the meniscus, however, the same causes an important effect on the lighting and thus on the appearance of characters.

The eye system 10 further includes an upper eyelid 18 and the lower eyelid 22. The same provide a boundary on the tear film layer 14. Because of the boundary, a meniscus is formed from the tear film layer 14 at the location of the eyelids. The meniscus, indicated in FIG. 1(B) by reference numeral 25, generally is adjacent the eyelid, and is formed around the entire perimeter thereof. However, because of the effect of gravity on the liquid of the tear film layer 14, an upper section 24 of the meniscus 25 may be thinner than a lower section 26. Of course, it will be understood that variations may occur.

Figure 2:
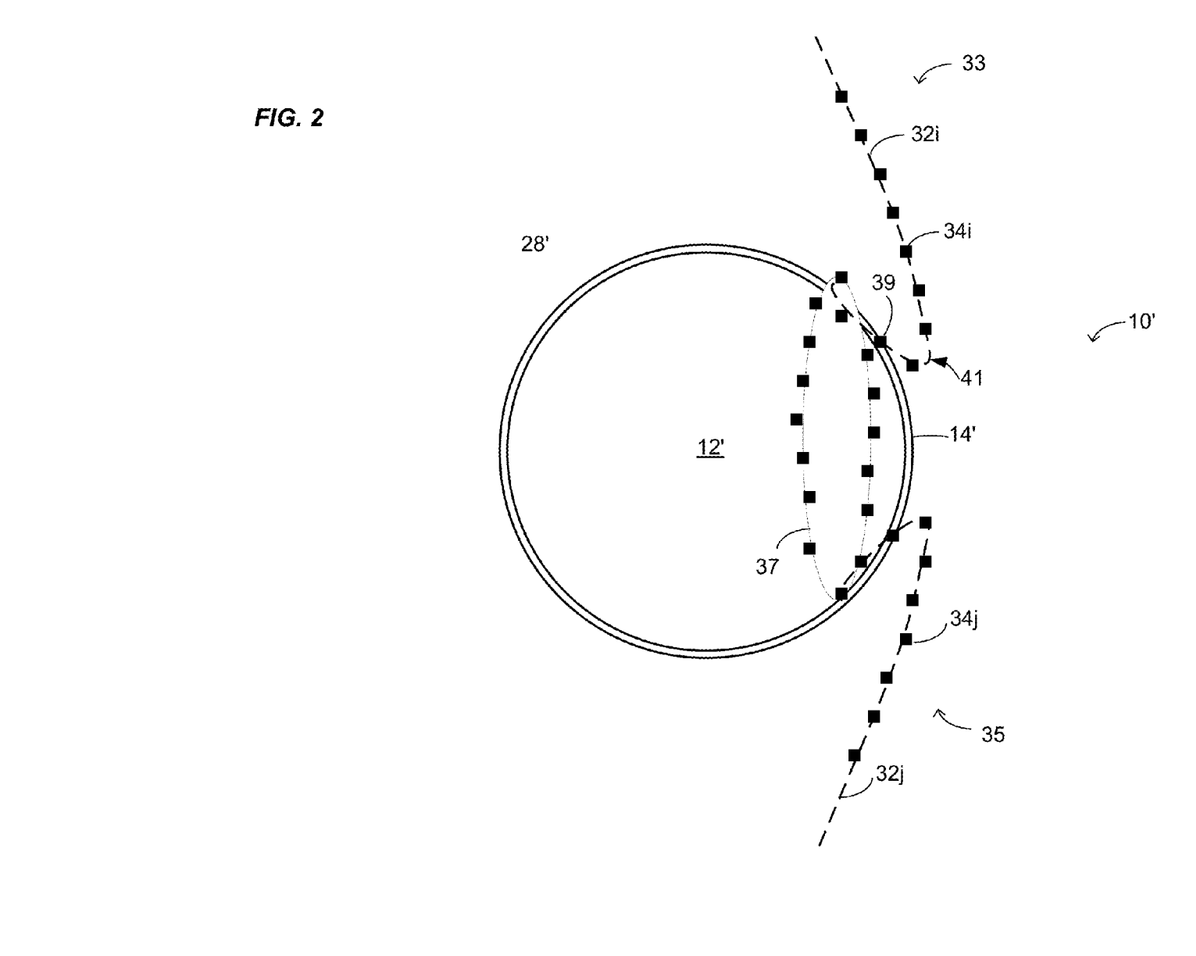
FIG. 2 illustrates a CG mesh diagram of an eye system, and in particular a cross-sectional diagram showing surfaces forming an eye socket and an eyeball.

The eye system 10 further includes an eye socket 28. A CG character is generally created with such an eye socket, as is illustrated in the CG mesh diagram of FIG. 2. In the CG model 10' illustrated in FIG. 2, an eyeball model 12' is illustrated in eye socket 28 with a tear film layer 14'. Surfaces 33 and 35 form the eye socket 28. In many cases, such eye sockets are modeled as holes in the CG character mesh, and being holes such have discontinuous boundary regions. By searching for such discontinuous boundary regions or other such recesses, the locations of these eye sockets may be automatically determined by the meniscus system. By such automatic determination, which may be procedurally analyzed, the system and method may provide a highly convenient way to create CG character menisci with little or no user input. For example, the system and method may search for polygons that are not completely surrounded by other polygons, e.g., have boundary edges, this indicating a discontinuous mesh. A boundary edge is illustrated in FIG. 2 by element 37 (points of the surface on element 37 are illustrated, but for clarity other points are shown only along the cross-section). Other searches may include for boundary edges that are connected, e.g., form an oval. Other tests, which may be performed in lieu of or in combination with tests for discontinuity, may include tests for proximity to a modeled eyeball. Other tests for determination of eye sockets will also be understood to be possible.

As seen in FIG. 2, the step described above locates an edge of a mesh, i.e., a boundary edge, and while the boundary edge is associated with an eye socket, it is not at the location of the eye socket itself. The reason is that modelers curve the mesh to depict a realistic eye socket, e.g., with curved flesh denoting eyelids, eye sockets, and the like; and as shown the curved mesh actually bends inside and away from the hole created, i.e., the mesh terminates inside the character's body, e.g., at the boundary edge.

To identify a point that is appropriate to bind the meniscus to, a first step is to identify an intersection point between the eyeball 12' and the surface 33/35. This step may be performed in a number of ways. In one method, a loop of surface material identified, e.g., the eye socket, is divided into a number of radial edges 32 (these edges roughly perpendicular to the loop defining the eye socket). Such radial edges act in some ways as a rail for a point to rest on, the point being to which the meniscus will bind. Generally one point will serve this purpose per rail, although more than one may also be used. In FIG. 2, radial edges 32i and 32j are illustrated, and in FIG. 3(A), radial edges 32a-32c are illustrated. While the number of radial edges will vary substantially based on the situation, in many cases the number may vary between 20 and 40. The geometry of the radial edges may be automatically created to match the eyelid spans that are already present.

It is noted that in some implementations, prior to the identification of radial edges, the loop of skin around the eye may be internally subdivided. This subdivision provides a number of desirable features. For example, it results in a higher fidelity meniscus that fits well with the subdivided skin mesh and also holds its shape better when subdivided itself. Moreover, as in many cases characters have their geometry subdivided at the time rendering, such subdivision can result in the surfaces of the eye, eyelid, and meniscus pulling apart. The step of internal subdivision noted above may significantly reduce such pulling apart.

Figure 3A:
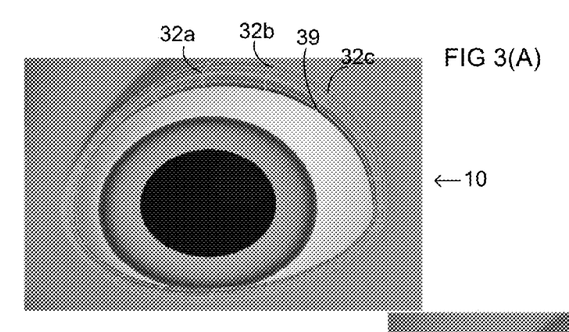
FIGS. 3(A)-3(C) illustrate steps of creation of a meniscus according to an implementation of the invention.

A number of points 34a, 34b, etc., are then defined along the radial edges, the same being indicated by sets of points 34i and 34j in FIG. 2 and sets of points 34a, 34b, etc., in FIG. 3(A). These points may be thought of as connecting line segments or "loops" along the radial edges, and the same may act as an index for points along the radial edge. For example, if the point which intersects the eyeball is defined as a zero point, several negative line segments may be defined towards the boundary edge 37, while several positive line segments may be defined along the eyelid towards the boundary of the eye socket.

The point at which the radial edge 32 intersects the eye 12' is then calculated. For example, the point may be defined by a simple line segment intersection with the eyeball, and may be defined with reference to and interpolating between the points 34. At this point or in a prior step, as noted the system may internally subdivide the region around the eye to allow for a better final fit. For example, in this step, the better final fit may allow a more accurate intersection point to be determined along the radial edge. In general the point may be defined approximately on the shelf where the eyelid comes out perpendicularly from the eye. In FIG. 2 and FIG. 3(A), a point 39 is illustrated as being at this intersection point, but it should be noted the intersection point may in general be between points 34a, 34b, etc.

Figures 3B, 3C:
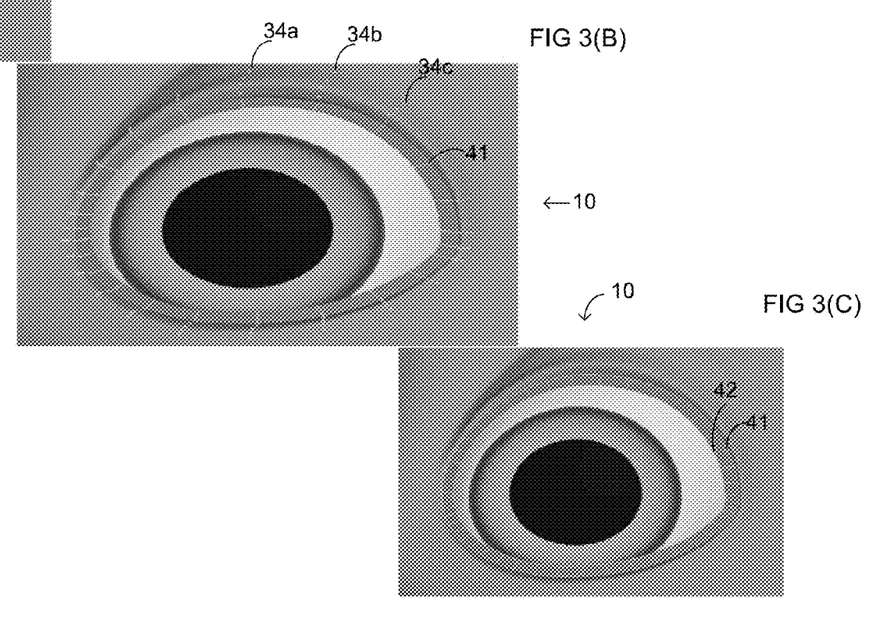

To create a point for the meniscus to bind to relative to the intersection point 39 another point may be defined offset along the eyelid, i.e., along the radial edge, measured relative to the intersection point 39, and defined by a parameter that defaults based on the size of the eye, to position the meniscus in the correct location. The point may also be stylistically determined or controlled by a parameter entered by the CG modeler. In FIG. 2 and FIG. 3(B), this point is indicated as point 41.

The set of points 41 may then be joined together to create a loop around the eye. This loop forms the outer boundary of the meniscus. The points of the outer boundary may then be lofted generally towards the center of the eye to create the meniscus geometry, i.e., a generally annular or frustal surface constituting the CG meniscus. An exemplary point 42 is illustrated in FIG. 3(C). The set of lofted points 42 forms an inner boundary of the meniscus. The amount of lofting may be according to a desired thickness or a default value but the same may generally also be controlled by a parameter entered by the modeler.

The set of lofted points 42 may then be optionally bound to the eyeball surface. Such provides a particularly simple geometry. However, depending on the desired appearance of the CG character, the set of lofted points 42 may also be offset a predefined distance from the eyeball surface. In some situations, the set of lofted points 42 may even go into the eyeball. In general, however, a slight offset is provided, and/or the edge between the meniscus and the eyeball (at the inner boundary) is removed in shading.

The surface defined by the outer boundary and the inner boundary may be annular but otherwise flat and uncurved. It is known that shaders, e.g., hair shaders, may be employed to curve otherwise uncurved surfaces, e.g., to give the same a cylindrical curve. It is desirable to be able to curve the surface with the shader because commonly the animator does not know how much curvature is necessary until they see lighting interactions and other effects. Thus, providing the ability to control such curvature later in the process is highly advantageous.

Other advantages may also be seen. For example, if the meniscus ribbon was initially created with a curved shape, e.g., by geometrically modeling the meniscus with the curve, the same may undesirably intersect or interfere with the eyelid, the eyeball, or other features. Such is particularly true as rendering introduces artifacts from floating-point precision errors, and closely-positioned surfaces may even switch places due to such errors. Thus the above-described procedural implementation is advantageous.

Another advantage is that shaders can provide the necessary types of curvature to achieve the desired (usually reflective) specular effects. For example, in most cases, a concave curvature is appropriate for a CG character meniscus. However, if the character is to appear highly emotional, a convex surface may be appropriate, indicating a significant amount of moisture in the eye. Shaders for this purpose may also be employed to make the bottom section of the meniscus thicker than the top section, properly simulating a meniscus under the effect of gravity.

It is noted that these types of changes, modifications, and alterations may be effected by simply entering a different parameter in the meniscus plug-in or node, described below. Artists or modelers can make these changes on their own without the need for programming or enlisting specialized assistance.

Figure 4:
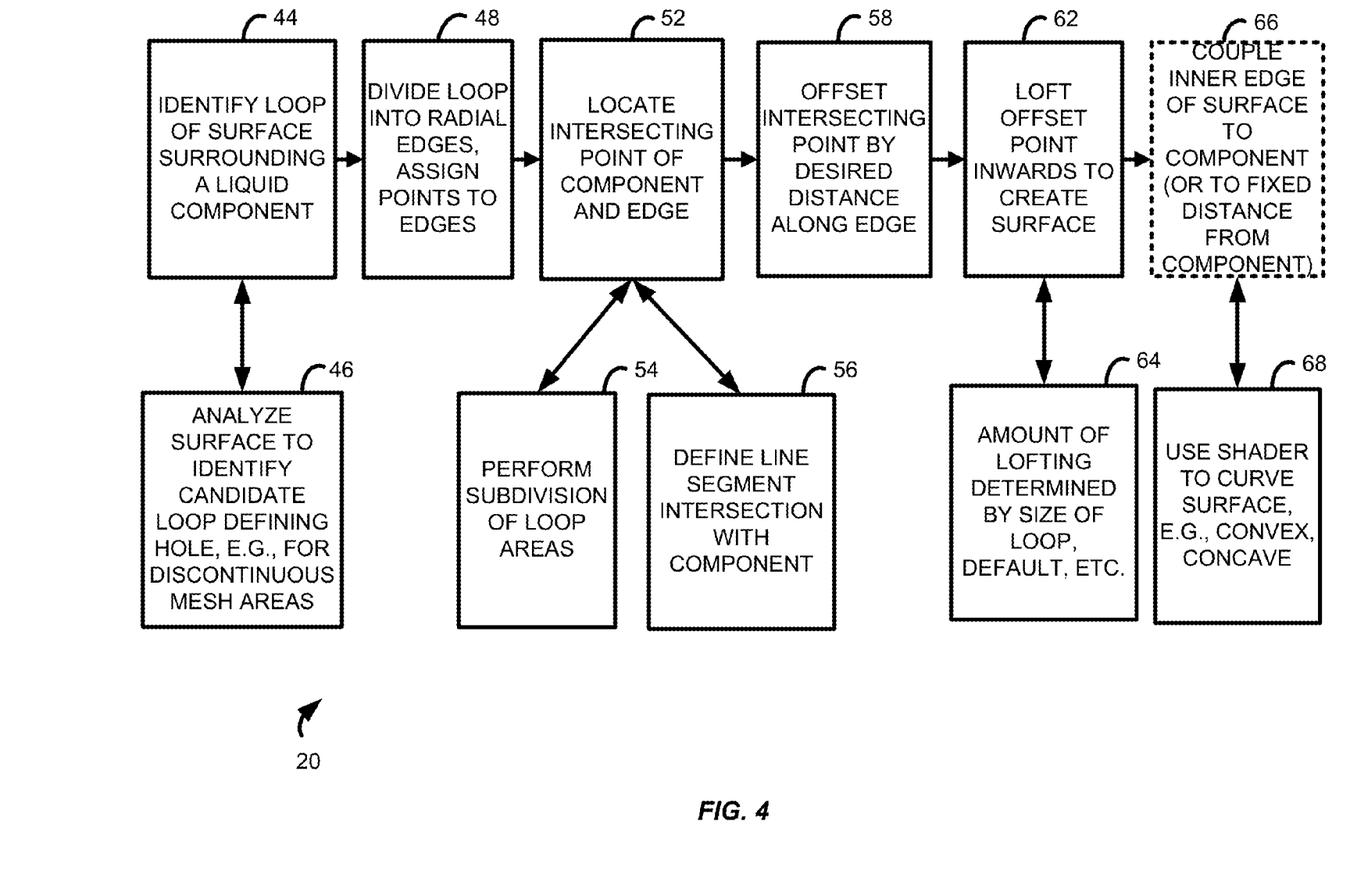
FIG. 4 illustrates a flowchart of a method according to an implementation of the invention, with regard to a generic liquid component with a surface forming a border.

Referring to FIG. 4, a flowchart 20 is illustrated depicting a general method according the principles described here, where a meniscus is procedurally created where any liquid component is adjacent a CG surface. In a first step of the flowchart 20, a liquid component is identified as well as a loop of a surface or volume surrounding the liquid component (step 44). It is noted in this regard that the term "liquid component" refers to a liquid or other viscous component. No particular degree of viscosity is implied and the invention is not to be limited thereby. One step of this process may be to analyze a surface to identify a candidate loop defining a hole, e.g., by searching for discontinuous mesh areas (step 46).

A next step is to divide the loop into a series of radial edges, and to assign points to the edges (step 48). This step is followed by a step of locating the intersecting point of the liquid component and the radial edge (step 52). Optional steps at this point may include performing subdivision of the loop areas (step 54), thereby to achieve a better fit of the surface and thus a more accurate intersection point with the radial edge. The intersection point of the liquid component and the radial edge may be obtained in a number of ways, including by defining a line segment intersection with the liquid component (step 56).

Another point is defined by offsetting the intersecting point by a desired distance along the radial edge (step 58). The offset point may then be lofted inwards to create a surface, the surface defining a ribbon-shaped meniscus (step 62). The amount of lofting may be determined in a number of ways, e.g., by the size of the loop, by a default percentage value, by user input, or the like (step 64).

As an optional step, the inner edge of the defined surface may be coupled to the liquid component, or coupled to be a fixed distance away from the component (step 66). A final step, which is also optional, is to use a shader to curve the surface, e.g., to give the same a convex or concave (or other) shape.

This above general method may be applied to not only eye systems but to any situations where a meniscus may be present, e.g., between teeth, etc.

Figure 5:
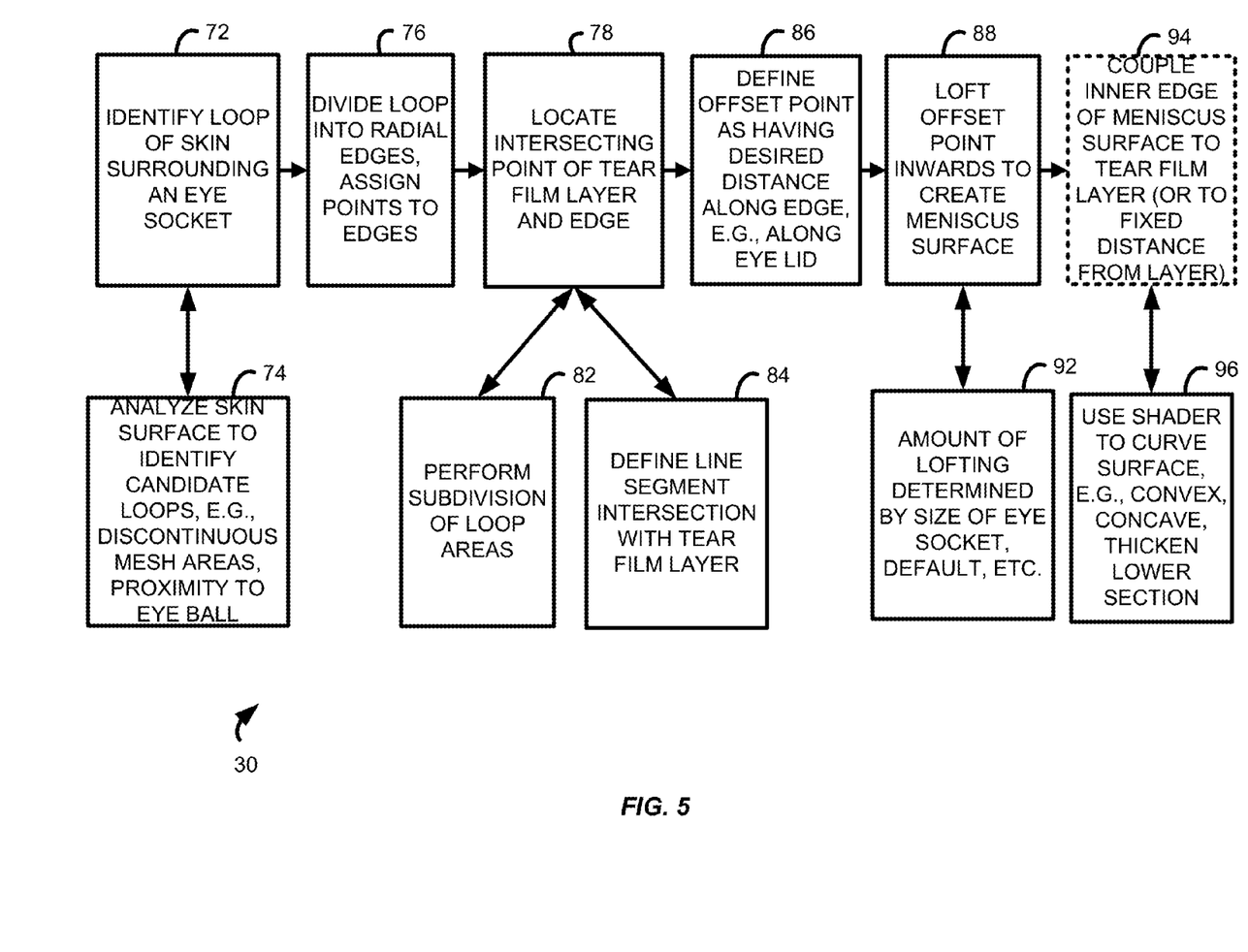
FIG. 5 illustrates a flowchart of a method according to another implementation of the invention, with particular regard to an eye meniscus of a CG character.

Referring to FIG. 5, a flowchart 30 is depicted for the specific case of an eye meniscus. A first step is to identify a loop of skin surrounding an eye socket (step 72). In one implementation, step 72 is accomplished through the analysis of a character skin's surface mesh to identify candidate loops, e.g., discontinuous mesh areas, especially with closed loop shapes. Proximity to a defined eyeball may also be employed to identify correctly an eye socket.

The loop is then divided into a series of radial edges, and points are assigned to the edges (step 76). As noted above, the placement of the radial edges may be in accordance with the defined spans of the CG mesh. Moreover, a step of internal subdivision (step 82) may occur to better define the surface of the eyelid and eye socket.

A next step is to locate the intersection point of the eyeball and the radial edge (step 78). A simple line segment intersection with the eyeball may be employed to locate this intersection point (step 84). The intersecting point is then used as a starting point for the definition of a set of offset points, the offset points located away from the intersecting point by a desired distance along the radial edge, e.g., along the eyelid (step 86). The set of offset points may be connected by a curve, the curve forming the outer boundary of the meniscus. The offset points may then be lofted inwards (step 88), e.g., towards the center of the eye, to obtain a set of lofted points, a curve through the set of lofted points defining an inner boundary of the meniscus. The inner and outer boundary of the meniscus forms a ribbon that defines the meniscus surface. The amount of lofting may be determined by the size of the eye, the eye socket, a default value, user input, or the like (step 92).

The inner edge or boundary of the meniscus may be coupled to the eyeball, or may be fixed to be a set distance away from the same (step 94). A shader may then be employed to curve the ribbon-shaped meniscus surface, e.g., to give a concave, convex, or other curved shape (step 96). The shader may also be employed to give a lower section of the meniscus a greater thickness than a top section of the meniscus, to properly simulate the effects of gravity on the liquid meniscus.

Figure 6:
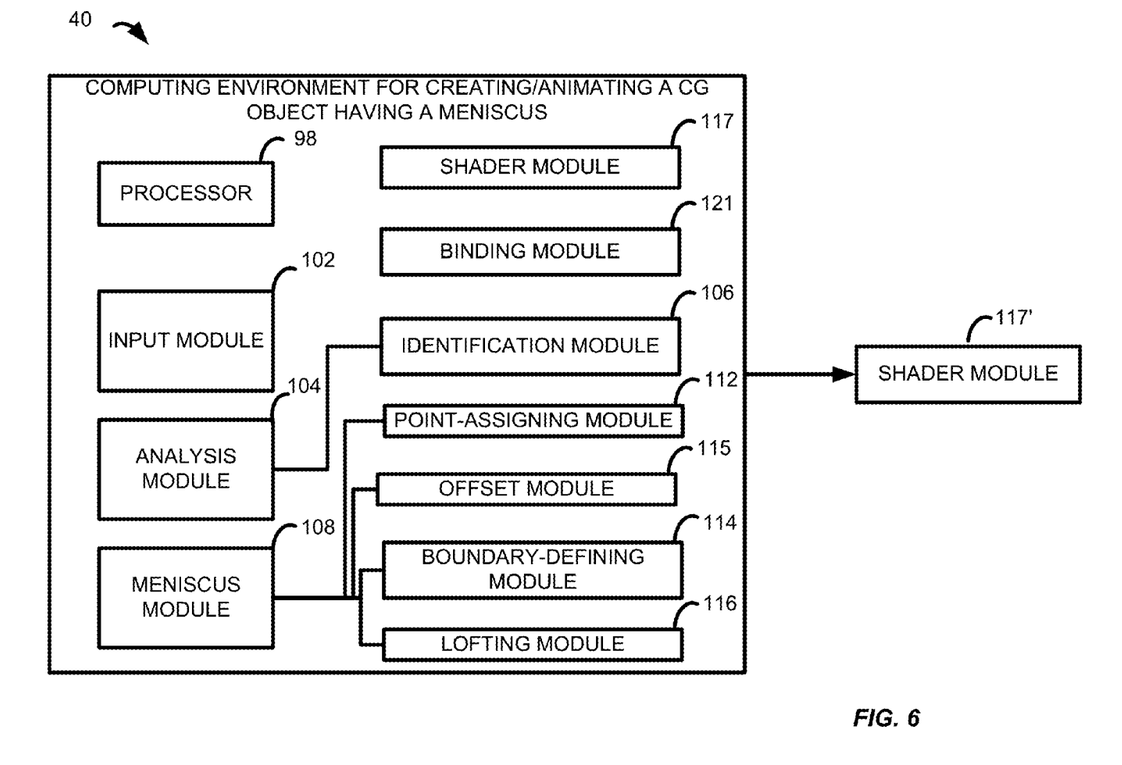
FIG. 6 illustrates a modular depiction of an implementation of the system according the principles described here.

Referring to FIG. 6, a computing environment 40 is illustrated for creating, modeling, and animating a CG object having an eye meniscus. The computing environment 40 may include a number of features, generally shown as a series of modules whose functions execute on a processor 98. One such module is an input module 102 to receive a computer-generated model. An analysis module 104 determines at least one feature of the model in which a liquid component may exhibit a meniscus. For example, the analysis module 104 may determine that an eye socket is present and thus an eyeball with a watery tear film layer may exhibit a meniscus when the tear film layer is adjacent an eyelid. To perform its tasks, the analysis module 104 may employ an identification module 106 to identify candidate liquid components, loops of modeled surface meshes surrounding the liquid components, or the like. The identification module 106 may further be employed to subdivide the loops of modeled surfaces into a number of radial edges, such radial edges serving as sites for points to be defined for a meniscus to bind to.

A meniscus module 108 may then be employed to modify the model or add to the model to cause a meniscus to appear, generally in a procedural fashion. The meniscus module 108 may include a point assigning module 112 to assign at least one point per radial edge defined above, the points used to determine a point of intersection with the liquid component, e.g., an eyeball with a tear film layer. The meniscus module 108 may further include an offset module 115 to define a set of points per radial edge, these offset points being for the meniscus to bind to. The offset points may correspond to but are separated from the points which intersect with the liquid component or eyeball. The method of separation may vary, but may be based on a characteristic length scale of the system, user preference, artistic direction, a default value, or the like. The meniscus module 108 further includes a boundary defining module 114 to define a boundary joining the offset points together. The curve or boundary connecting the offset points generally forms an outer boundary of the meniscus.

The meniscus module 108 further includes a lofting module 116 to loft the offset points by a desired distance to create an inner boundary of the meniscus, the inner and outer boundaries defining a ribbon around a portion of the eye or other such liquid components.

Additional modules which may be employed include a binding module 121 to bind the inner boundary of the ribbon to the eyeball or liquid component, or to affix the same in another fashion, e.g., to fix the inner boundary at a predetermined distance above or within the eyeball. The computing environment 40 may then send results to a shader module 117', or may incorporate a shader module 117 within the environment, for curving the meniscus component which was procedurally created, e.g., to give the same a convex, concave or other shape.

It is noted in regard to FIG. 6 that the computing environment 40 may be implemented as a plug-in for an animation program, e.g., Autodesk Maya®, available from Autodesk Incorporated, of San Rafael, Calif. Certain application program such as Maya® have APIs that allow the same to be extended by way of nodes or plug-ins, e.g., dependency graph nodes. Maya® may have a node that generates an eye, and the node or plug-ins described here may generate a meniscus.

The meniscus generation may be performed in a procedural manner, where "procedural" means to generate geometry according to what is required by input parameters, as opposed to constructing a model. By use of this procedural method, the created meniscus may move and be bound, and stay bound, to a moving CG object such as an eyeball or a tear film layer on the eyeball. Such methods accept parameters as input, and produce a CG mesh as an output. However, traditional modeling tools are not employed to create the CG mesh, as the same would then require being bound to a moving body, being moved with the moving body, and other cumbersome manipulations.

In the case of a Maya® plug-in, the parameters may be exposed and the node can accept the parameters and output a product that fits the parameters.

What has been described are systems and methods for creating a CG eye meniscus, and in particular in a procedural fashion. Implementations of the systems and methods provide a highly "organic" and "live" meniscus to be created and controlled. Whatever movements the eye and eye lid make, the meniscus will track such and can be modeled properly. By tracking correctly with the eye, the surface of the meniscus may be kept angled forward, thus capturing consistent highlights during animated sequences.

One implementation includes one or more programmable processors and corresponding computer system components to store and execute computer instructions, such as to provide the tools for creating, storing, and controlling the created meniscus. One such computing environment is disclosed below.

Figure 7:
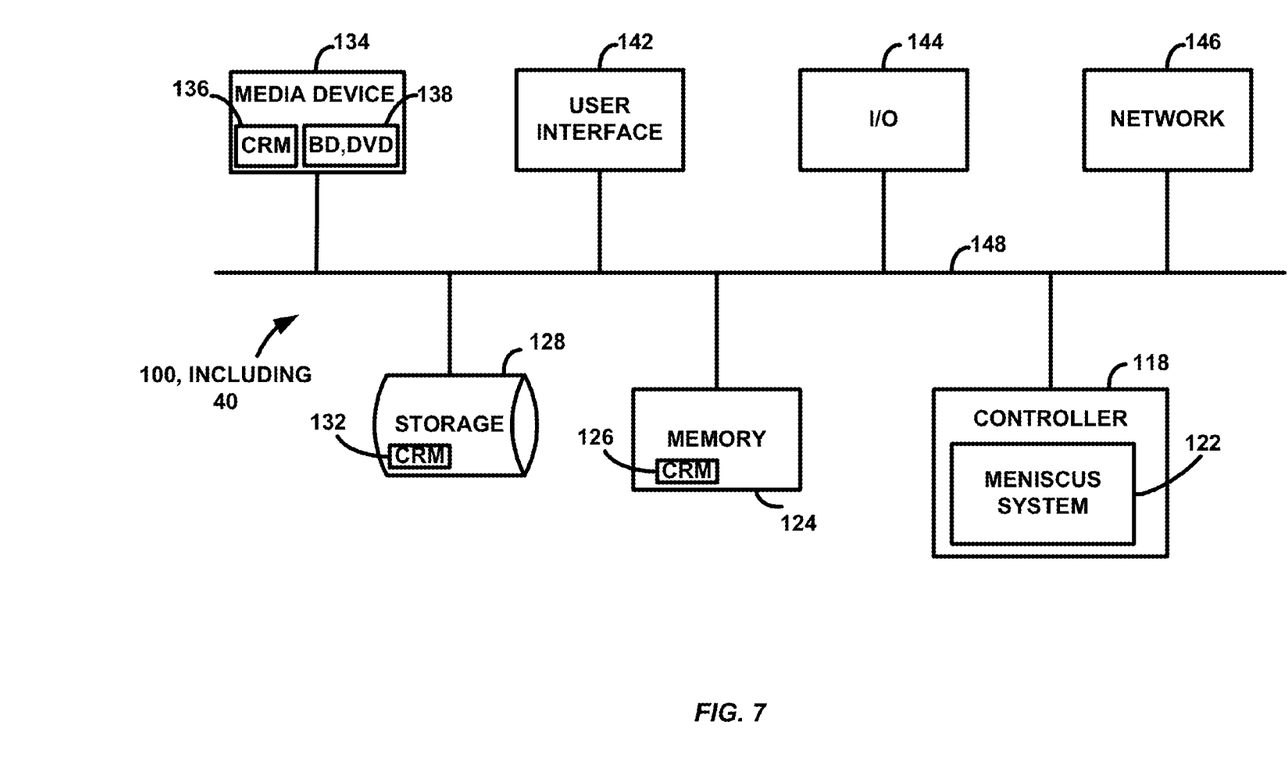
FIG. 7 illustrates a computing environment that may be employed in the system and method according to principles disclosed here.

Referring to FIG. 7, a representation of an exemplary computing environment 100 for an animation and modeling workstation is illustrated.

The computing environment 100 includes a controller 118, a memory 124, storage 128, a media device 134, a user interface 142, an input/output (I/O) interface 144, and a network interface 146. The components are interconnected by a common bus 148. Alternatively, different connection configurations can be used, such as a star pattern with the controller at the center.

The controller 118 includes a programmable processor and controls the operation of an meniscus creation system 122. The controller 118 loads instructions from the memory 124 or an embedded controller memory (not shown) and executes these instructions to control the system.

Memory 124, which may include non-transitory computer-readable memory 126, stores data temporarily for use by the other components of the system. In one implementation, the memory 124 is implemented as DRAM. In other implementations, the memory 124 also includes long-term or permanent memory, such as flash memory and/or ROM.

Storage 128, which may include non-transitory computer-readable memory 132, stores data temporarily or long-term for use by other components of the system, such as for storing data or instructions. In one implementation, the storage 128 is a hard disc drive or a solid state drive.

The media device 134, which may include non-transitory computer-readable memory 136, receives removable media and reads and/or writes data to the inserted media. In one implementation, the media device 134 is an optical disc drive or disc burner, e.g., a writable Blu-ray® disc drive 138.

The user interface 142 includes components for accepting user input, e.g., the user indication of parameters corresponding to the size and appearance or other features of menisci, or other aspects discussed above, and presenting a display, e.g., of the created meniscus and CG character to the user. In one implementation, the user interface 142 includes a keyboard, a mouse, audio speakers, and a display. The controller 118 uses input from the user to adjust the operation of the computing environment.

The I/O interface 144 includes one or more I/O ports to connect to corresponding I/O devices, such as external storage or supplemental devices, e.g., cloud storage devices, a printer or a PDA. In one implementation, the ports of the I/O interface 144 include ports such as: USB ports, PCMCIA ports, serial ports, and/or parallel ports. In another implementation, the I/O interface 144 includes a wireless interface for wireless communication with external devices. These I/O interfaces may be employed to connect to one or more content playback devices.

The network interface 146 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and are within the scope of the present invention. For example, the disclosed systems and methods can be applied to images from movies, television, video games, etc. Moreover, while the above description has primarily been with regard to an eye meniscus, menisci may be modeled for other situations in which a liquid component is adjacent a surface, e.g., between teeth, and so on.

Accordingly, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of creating a meniscus for a computer-generated object, comprising:
    in a computer-generated object, for a liquid component surrounded by a surface mesh, automatically identifying a loop of the surface mesh surrounding the liquid component as a locus of points for a meniscus to potentially bind to;
    dividing the loop into a number of radial edges, and assigning at least one point per radial edge to create a plurality of points, the points for the meniscus to bind to, at least one point of the plurality not in contact with the liquid component;
    drawing a curve, the curve joining the plurality of points together to form an outer boundary of the meniscus; and
    lofting the points by a desired distance to create an inner boundary of the meniscus, the inner and outer boundary forming a ribbon around a portion of the liquid component, the ribbon defining the meniscus.

2. The method of claim 1, wherein the object is a character, the liquid component is a tear film layer, and the surface is an eye socket.

3. The method of claim 2, further comprising analyzing a surface of a character to identify a candidate eye socket by searching for one or more recesses or discontinuous mesh areas.

4. The method of claim 3, further comprising identifying a correct eye socket using at least in part proximity of a recess or discontinuous mesh area to an eyeball, the eyeball having the tear film layer defined thereon.

5. The method of claim 2, wherein a position of the at least one point of the plurality not in contact with the liquid component is defined by finding an intersection of the radial edge with the eyeball having the tear film layer defined thereon, and offsetting the point a desired distance along the radial edge away from the intersection.

6. The method of claim 5, wherein the desired distance is at least in part dependent on the size of the eye socket.

7. The method of claim 5, wherein the desired distance is a default value or is a parameter entered by a user.

8. The method of claim 2, further comprising coupling the inner boundary of the meniscus to a set of points on the eye on the tear film layer on the eyeball.

9. The method of claim 2, wherein the meniscus is configured such that a lower section is thicker than an upper section.

10. The method of claim 2, wherein a shape or thickness of the meniscus is configured by a shader.

11. The method of claim 10, wherein the shape is concave.

12. The method of claim 10, wherein the shape is convex.

13. The method of claim 10, wherein the shader configures the shape such that a lower portion of the meniscus is thicker than an upper portion of the meniscus.

14. The method of claim 1, wherein at least the assigning, drawing, and lofting steps are performed procedurally.

15. A non-transitory computer-readable medium, comprising instructions for causing a computing environment to perform the method of claim 1.

16. A meniscus plug-in residing on a non-transitory computer-readable medium for a computer-generated modeling application, the plug-in comprising:
    an input module to receive a computer-generated model;
    an analysis module to automatically determine at least one feature of the module in which a liquid component may exhibit a meniscus; and
    a meniscus module to procedurally modify the model or procedurally add to the model to cause a meniscus to appear.

17. The plug-in of claim 16, further comprising a shader module to modify the shape or thickness of the meniscus.

18. The plug-in of claim 16, wherein the meniscus module further comprises:
    for the feature, an identification module to automatically identify a loop of surface around the feature as a locus of points for the meniscus to potentially bind to and to divide the loop into a number of radial edges;
    a point-assigning module to assign at least one point per radial edge, the point in contact with or intersecting with the liquid layer;

an offset module to define at least one offset point per radial edge, the offset point not in contact with the liquid layer, a set of offset points for the meniscus to bind to;

a boundary-defining module to define a boundary, the boundary joining the points together to form an outer boundary of the meniscus around the feature; and a lofting module to loft the offset points by a desired distance to create an inner boundary of the meniscus, the inner and outer boundary forming a ribbon around a portion of the feature, the ribbon defining the meniscus.

19. The plug-in of claim 18, further comprising a binding module to bind the inner boundary to the feature.

20. The plug-in of claim 18, wherein the meniscus module is configured such that at least the assigning, drawing, and lofting steps are performed procedurally.

\* \* \* \* \*